Dec. 24, 1968 M. P. SEIDEL ET AL 3,417,466
METHOD OF MAKING A WINDING FOR AN ELECTRICAL
INDUCTIVE APPARATUS
Original Filed May 17, 1965 2 Sheets-Sheet 1
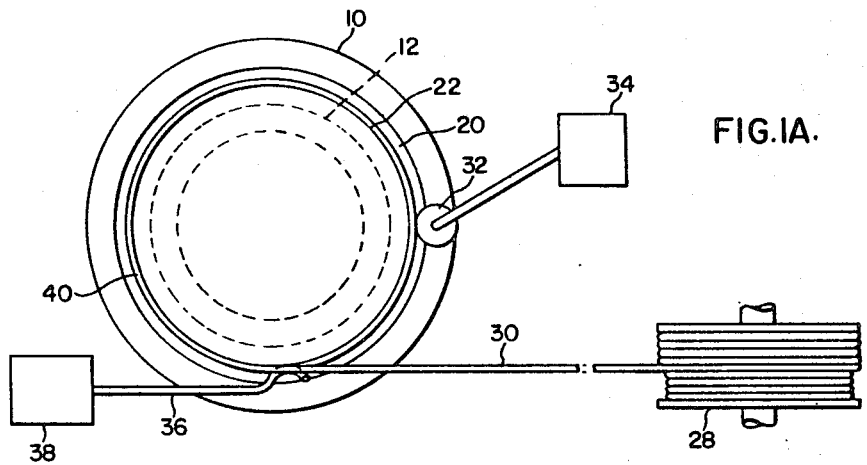
FIG.IA.
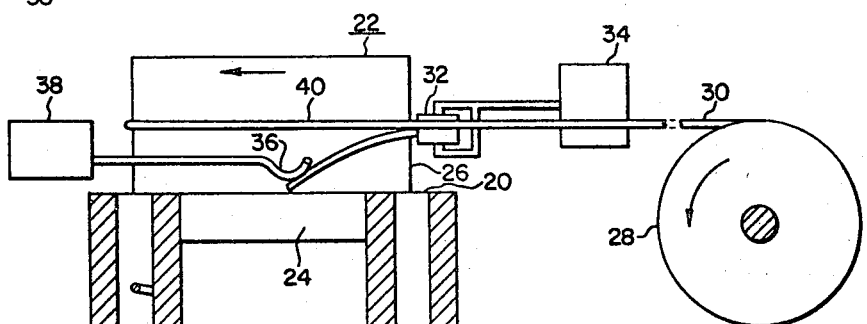
FIG.I.
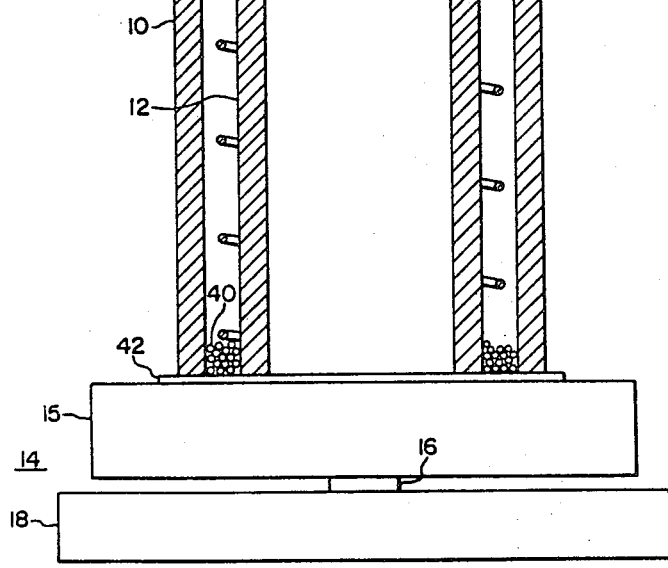
INVENTORS
Martin P. Seidel,
Fred L. Norton &
Edward C. Wentz.
BY Donald R. Lackey
ATTORNEY

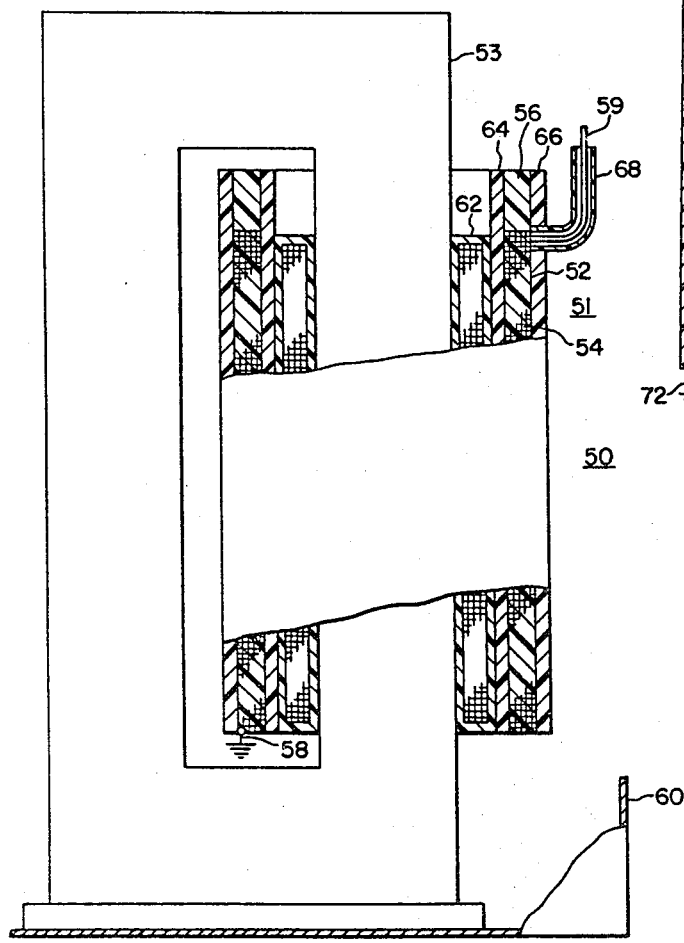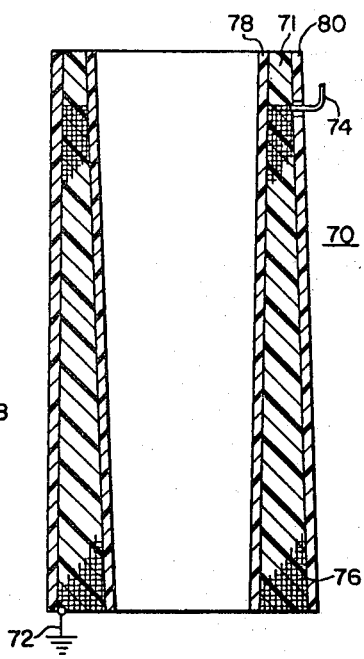
FIG.2.
FIG.3.

United States Patent Office 3,417,466
Patented Dec. 24, 1968

3,417,466
METHOD OF MAKING A WINDING FOR AN
ELECTRICAL INDUCTIVE APPARATUS
Martin P. Seidel and Fred L. W. Norton, Sharon and Edward C. Wentz, Sharpsville, Pa., assignors to Westinghouse Electric Corporation, Pittsburgh, Pa., a corporation of Pennsylvania
Original application May 17, 1965, Ser. No. 456,229, now Patent No. 3,327,267, dated June 20, 1967. Divided and this application Aug. 26, 1966, Ser. No. 575,381
10 Claims. (Cl. 29—605)

This is a division of application Ser. No. 456,229, filed May 17, 1965, now Patent No. 3,327,267, which is assigned to the same assignee as the present application.

This invention relates in general to electrical inductive apparatus, and more particularly to potential transformers and methods of constructing same.

Instrument transformers, which are used to measure high potentials, have a primary winding constructed of many thousands of turns of an electrical conductor, such as enamel insulated copper wire. Since the current flow in the primary winding is measured in milliamperes, the wire diameter is selected to be as small as possible, to keep the radial build, weight, and cost of the winding at a minimum.

The large number of turns associated with the primary winding of high voltage potential transformers presents the mechanical problem of winding and anchoring the fine wire turns, and also the electrical problem of obtaining a winding structure that will withstand impulse and surge voltages. These windings are commonly formed by layer, winding the turns upon insulating tubes, or randomly winding the turns on specially formed or molded bobbins or spools. Layer winding has the disadvantage of having relatively large differences in potential between certain of the end turns of adjacent winding layers, and the use of specially molded winding forms increases the cost of the winding structure. It would be desirable to provide a winding structure which securely anchors each winding turn, has a low potential difference between both adjacent winding layers and turns, eliminates specially molded winding forms, and has the abiilty to withstand impulse voltages without failure of the insulation between turns, or failure of the supporting insulating members, in puncture or creep.

Accordingly, it is an object of the invention to provide a new and improved instrument transformer for measuring high potentials.

Another object of the invention is to provide a new and improved primary winding for potential transformers.

A further object of the invention is to provide a new and improved primary winding for potential transformers which does not require specially preformed supporting members.

Another object of the invention is to provide a new and improved primary winding for potential transformers in which the conductor turns are securely anchored.

Still another object of the invention is to provide a new and improved primary winding for potential transformers in which the potential between adjacent winding layers and turns is low.

A further object of the invention is to provide a new and improved primary winding for potential transformers which has the capability of withstanding high surge and impulse voltages.

Another object of the invention is to provide a new and improved method of constructing high voltage potential transformers.

Still another object of the invention is to provide a new and improved method of forming a primary winding for a potential transformer which does not require specially preformed supporting members, and which creates a winding structure having a relatively low potential difference between adjacent turns, and the ability to withstand surge and impulse voltages.

Briefly, the present invention accomplishes certain of the above cited objects by providing a new and improved method of forming the primary winding for high voltage potential transformers, which does not require any specially preformed members. The winding mold merely comprises two concentrically disposed spaced tubular members disposed on rotating means with their central axes being substantially vertical. The outside diameter of the inner tubular member and the inside diameter of the outer tubular member are selected to provide the desired radial build of the winding. A mandrel having a diameter equal to the arithmetic mean of the inside diameter of the outer tubular member and the outside diameter of the inner tubular member is disposed directly over the concentrically disposed inner and outer tubular members. The mandrel is disposed to rotate with the inner and outer tubular members when they are driven by the rotating means, with the diameter of the mandrel being aligned with the main diameter of the opening or space defined by the spaced inner and outer tubular members. The winding is formed by winding or spinning turns onto the mandrel, which are then directed to the lower end of the mandrel where they drop into the space or opening defined between the inner and outer tubular members. The winding turns distribute themselves in a random manner to fill-up the space between the inner and outer tubular members, and build up vertically from the bottom of the space, or coaxially along the length of the winding, to a predetermined vertical height. A suitable liquid bonding means such as a liquid epoxy resin is then introduced into the space defined between the inner and outer tubular members, which bonding means surrounds the conductor turns, and is cured to form a solid, coherent winding structure. The cast, solid winding structure may then be removed from the inner and outer tubular members, or the inner and outer tubular members may be formed of an electrical insulating material and retained around the cast solid winding structure to serve as the major insulation of the winding to ground.

The present invention accomplishes the remaining cited objects by providing a new and improved winding for high voltage potential transformers. The winding has each if its conductor turns securely anchored in bonding means, with the turns building up across the build thickness or radial thickness of the winding and then proceeding coaxially along the length of the winding as it builds up the radial space. Each of the conductor turns which form the primary winding of the potential transformer have the same diameter, which is equal to the mean diameter of the winding radial width, and the turns distribute themselves in a random manner to fill the radial space. The radial thickness of the winding is small compared to the overall length of the winding, producing random layers having a length which cannot exceed the radial width of the winding, thus, there is very little potential difference between adjacent turns. Further, the winding has excellent ability to withstand impulse and surge voltages, because each of the turns are anchored in the bonding means, and because the winding builds-up from one end of the winding to the other, and does not proceed back and forth between the winding ends, as in layer wound windings. No specially formed spools or bobbins are required, as the winding form is merely the space defined between two concentrically disposed, spaced tubular members. The bonding means is disposed into the space defined between the two spaced tubular members and cured, with the cast structure being removed from the winding form if desired, or the two spaced tubular members may be formed of an electrical insulating material and firmly bonded to the winding structure by the bonding means. The spaced tubular members thus serve as the major winding insulation to ground.

Further objects and advantages of the invention will become apparent as the following description proceeds and features of novelty which characterize the invention will be pointed out in particularly in the claims annexed to and forming a part of this specification.

For a better understanding of the invention, reference may be had to the following detailed description, taken in connection with the accompanying drawings, in which:

FIGURE 1 is an elevational view, partially in section, of apparatus which illustrate a method of constructing a primary winding for a potential transformer, according to the teachings of one embodiment of the invention;

FIG. 1A is a plan view of the apparatus of FIG. 1;

FIG. 2 is an elevational view, partially in section, illustrating a potential transformer constructed according to the teachings of an embodiment of the invention, and FIG. 3 is an elevational view in section, illustrating the primary winding of a potential transformer constructed according to the teachings of another embodiment of the invention.

Referring now to the drawings, and FIGS. 1 and 1A in particular, there is shown elevational and plan views, respectively, of apparatus which illustrate a new and improved method of constructing the primary winding of a high voltage potential transformer, which requires no specially formed supporting structure, and yet provides an improved winding structure which has a very low potential difference between adjacent winding layers and turns, and which has excellent surge and impulse voltage characteristics.

In general, the new and improved method requires first and second tubular members, 10 and 12, which are concentrically disposed about a common vertical axis on rotating means 14. Rotating means 14 may include a turntable 15, as shown, having a concentrically disposed shaft 16 which supports turntable 15, and which is driven by suitable driving means 18; or, any other suitable means for rotating tubular members 10 and 12 may be utilized. Tubular members 10 and 12 are disposed on rotating means 14 with their axes aligned in a vertical manner with the axis of turntable 15. Each tubular member 10 and 12 has a predetermined length determined by the length of the winding to be formed. The outside diameter of the inner tubular member 12 and the inside diameter of the outer tubular member 10 are selected to define a space or opening 20 between the tubular members, which determines the radial build or thickness of the substantially tubular shaped winding. A mandrel or capstan 22 is disposed at the top of the vertically disposed tubular members 10 and 12, in a manner which allows it to be rotated when tubular members 10 and 12 are rotated by rotating means 14. As shown, the mandrel 22 may have a projecting portion 24 which fits the inside diameter of the inner tubular member 12 in a close fitting manner, to thus rotate mandrel 22 when tubular members 10 and 12 are rotated. Mandrel 22 also has a cylindrical surface 26, which has a predetermined height, and a diameter equal to the arithmetic mean of the outside diameter of inner tubular member 12, and the inside diameter of outer tubular member 10. Cylindrical surface 26 of mandrel 22 extends to the start of the opening 20 defined by the outer and inner tubular members 10 and 12, respectively, and is aligned to bisect the width of the radial opening.

A conventional reel or drum 28, containing electrically insulated wire 30, such as enameled copper, is disposed in a convenient location to the mandrel 22, and the end of the wire 30 is disposed to surround the cylindrical surface 26 of mandrel 22. A torque tensioned follower roll or wheel 32 is used to secure the wire 30 to the mandrel 22 as it comes from the reel 28, to form and hold a complete turn 40 to the mandrel 22. Follower roll 32 is supported by means 34, which is mounted remotely from the rotating means 14.

A turn depressing wire guide 36 rides against the surface 26 and mandrel 22, which is supported by means 38 also mounted remotely from rotating means 14. The rotating means 14 rotates the inner and outer tubular members 10 and 12, respectively, along with mandrel 22. The rotation of mandrel 22 causes the wire 30 which has been threaded around surface 26 of mandrel 22 and under follower roll 32 to form a turn 40. Follower roll 32 has a width sufficient to bind the turn 40 of wire 30 to the surface 26.

When the first turn 40 is formed on surface 26 of mandrel 22, the end of the wire is directed under guide 36. Thus, as the mandrel 22 rotates, turns 40 are formed which immediately are guided by guide 36 into the space 20 between the concentric, spaced tubular members 10 and 12. In other words, after each turn 40 is formed, it is moved downward over the surface 26 by wire guide 36, as the next turn is being formed, allowing the turns to be dropped from the surface 26, and fall into the opening 20 defined by the outer and inner diameters of tubular members 12 and 10, respectively.

Thus, the process is continuous, with turns 40 being formed and directed to the space between the tubular members 10 and 12. While one turn is shown in FIG. 12 being held captive by roll 32, it will be obvious that any number of turns could be held captive by the roll 32 before the end of the wire 30 is directed away from roll 30 by wire guide 36.

It will be noted that the diameter of conductor turn 40 is equal to the arithmetic mean of the inside diameter of outer tubular member 10, and the outside diameter of inner tubular member 12. Thus, the turns are free to randomly distribute themselves across the radial width of space 20, and they start building up vertically, or along the axis of tubular members 10 and 12, as each randomly wound layer is filled with conductor turns. This process continues until a predetermined number of turns 40 have been dropped into the space 20, resulting in a winding having a predetermined radial build, and a predetermined axial length.

After a predetermined number of turns 40 have been dropped into space 20, the mandrel 22 is removed, and the space 20 filled to a predetermined level with liquid bonding means, such as an epoxy resin. A gasket member 42 may be disposed at the bottom of the inner and outer tubular members 12 and 10, to prevent leakage of the liquid resin. In order to prevent the occurrence of voids between the plurality of turns and the liquid resin, the winding formed of turns 40 may be vacuum impregnated with the resin. The resin may then be cured to form a cast solid, by subjecting it to an appropriate time-temperature cycle, with the turns 40 being completely cast in a voidless, solid resin. The bonding means may be any suitable polymerizable organic material, such as a polymer selected from either thermoplastic or thermosetting categories. If selected from the thermoplastic category, the bonding means should be selected to have a softening temperature well above the operating temperature of the winding.

The liquid epoxides of the thermoset group have been found to be excellent, and may utilize a finely divided inorganic filler selected to approximate the coefficient of expansion of the winding turns 40. For example, bonding means which includes a liquid epoxide sold by Union Carbide under the tradename UNOX 201, phthalic acid anhydride, benzyl, amine, and silica flour, in the weight ratio of 40:20:0.6:40, may be used.

Tubular members 10 and 12 may be formed of stainless steel, or any other suitable material, and coated with a suitable mold release material, such as silicone grease, to prevent the bonding means used to encapsulate the winding turns 40 from adhering to the tubular members 10 and 12.

Thus, a new and improved method of winding the primary winding of a potential transformer has been disclosed, which does not require preformed bobbins or spools, and which does not layer wind the turns across the length of the winding. The disclosed process forms conductor turns all having the same diameter, which are randomly distributed across the radial width of the winding, and which build up along the axial length of the winding. Thus, there is very little potential difference between adjacent turns, and the winding building up as it does from one end of the winding to the other, instead of wound layers which build radially, provides a winding structure having a high impulse voltage strength. The bonding means, which anchors the individual turns, forms a solid, coherent winding structure, and adds to the impulse resistance of the winding and its overall insulating strength.

Instead of utilizing metallic tubular members 10 and 12 to catch the turns 40 as they drop from mandrel 22, the tubular members 10 and 12 may be made to serve a dual purpose by forming them of an electrical insulating material, such as pressboard or one of the laminated plastic materials. The insulating tubular members 10 and 12 initially serve the purpose of catching the turns 40, the same as the metallic tubular members shown in FIGURE 1. However, instead of placing a molding releasant material on the outside diameter of inner tubular member 12, and the inside diameter of outer tubular member 10, the bonding material is allowed to adhere to the tubular insulating member, with the wall thickness of the tubular insulating members being selected to provide the major winding insulation to ground. The bonding means penetrates into the surfaces of the insulating tubular members when the space 20 is filled with liquid bonding means, thus improving the dielectric strength of the insulating tubular member, both in puncture and in creep.

FIGURE 2 illustrates an elevational view of a potential transformer 50, partially in section, and constructed according to the teachings of the invention. Potential transformer 50 includes a winding assembly 51 disposed in inductive relation with a magnetic core 53. The winding and magnetic core assembly is disposed within an enclosure or casing 60, which may be filled to a predetermined level with a suitable insulating dielectric fluid, such as oil. Winding assembly 51 includes a primary winding 52 and secondary winding 62, both disposed in concentric inductive relation about one of the winding legs of magnetic core 53. Primary winding 52 has a plurality of randomly wound turns 54, each having the same diameter, which diameter is equal to the arithmetic mean of the inside and outside diameters of the primary winding 52. The turns 54 are all completely encapsulated in a voidless, cast, bonding means 56, which securely anchors the turns 54. The turns 54 start at the bottom portion of the winding 52, with the end of the first winding turn 54 being grounded as shown at 58. The turns 54 are randomly distributed across the radial width of the winding 52, and build up axially along the winding length as the radial width is filled with turns, until a desired number of turns has been obtained. The end of the last turn 54 is connected to an insulated conductor 59, which proceeds through the casing 60 through suitable insulating means having a terminal connector thereon (not shown).

Primary winding 52 has inner and outer tubular insulating members 64 and 66 disposed on its inner and outer diameters, which form the major insulation to ground for primary winding 52. Tubular members 64 and 66 may be individually disposed to contain winding 52 between them, or they may be initially used as the catcher tubes for the winding turns 54, with the insulating tubes 64 and 66 being firmly bonded to the primary winding 52 by the same bonding means 56 which anchors and encapsulates the conductor turns 54. Insulating tubular member 66 has an opening therein into which a hollow insulating member 68 may be inserted, for bringing conductor 58 from the end of the last winding turn 54 through the wall of insulating member 66.

The primary winding 54 of potential transformer 50 has a high impulse voltage strength, due to the anchorage and insulation of the winding turns 54 in a cast, solid, bonding means 56, and due to the manner in which the winding is built up from ground 58 to the opposite end of the winding at conductor 59. A winding structure having an even greater impulse capability is shown in FIGUURE 3, which winding structure may also be produced by the new and improved method shown in FIGURE 1 and hereinbefore described.

FIGURE 3 illustrates an elevational view of a primary winding structure 70, in section, for a high voltage potential transformer. In general, winding structure 70 is pyramidal in shape, having its broadest portion at the bottom, near ground 72, and its narrowest portion at the top, at the connection of the end of the last turn 76 to conductor 74. Conductor 74 is connected to the high voltage to be measured. This pyramidal configuration of primary winding 70 is excellent in withstanding surge and impulse voltages, as a surge voltage concentrates at the portion of the winding which is nearest its connection to the high voltage. By reducing the number of turns in the portion of the winding connected to the high voltage, and gradually increasing the number of turns as the winding proceeds to the ground connection, the voltage stress can be more evenly distributed, preventing stress concentrations which may cause the insulation to fail.

More particularly, primary winding 70 includes a plurality of turns 76 embedded in a voidless, cast bonding means 71. The turns 76 start at the lower end of winding 70 at ground 72, and are randomly disposed across the radial width of the winding and build up axially along the length of the winding structure, to conductor 74. The diameter of each of the turns 76 is always the same, being equal to the arithmetic mean of the inside and outside diameters of the solid cast bonding means 71. Even though the inside and outside diameters of bonding means 71 continuously varies along the axial length of the winding, the arithmetic mean is always constant. Thus, the winding structure 70 may be formed by the new and improved method shown in FIGURE 1 and hereinbefore described.

The solid insulation to ground for winding 70, which includes the hollow, frustum shaped inner and outer insulating members 78 and 80 may be disposed against the solid cast bonding means 71 after the bonding means has been cured and solidified. Or, insulating members 78 and 80 may have been initially used as catcher tubes for the turns 76, and the container or mold for the bonding means 71. Bonding means 71 will adhere to the outside diameter of inner member 78, and the inside diameter of outer member 80, after bonding means 71 has been cured. It will be noted that the outer hollow frustum shaped member 80 has its broadest portion at the bottom of the assembly near ground 72, while the inner hollow frustum shaped member 78 is "upside down," with its broadest portion at the top of the winding assembly 70, near high voltage conductor 74. This arrangement of the inner and outer frustum shaped members narrows the winding space at the top of the winding assembly, and broadens the winding space at the base of the winding assembly, allowing more conductor turns 76 to be disposed near ground 72, and continuously decreasing the number of turns as the winding axially builds up towards the upper portion of the winding assembly 70.

In summary, a new and improved method of constructing the primary winding of potential transformers has been disclosed, which includes spinning and winding conductor turns upon a mandrel, directing the turns downwardly on the mandrel surface to allow them to drop from the lower end of the mandrel, catching the turns in concentrically disposed catcher tubes, spaced to provide an opening between their adjacent diameters which has an arithmetic mean equal to the diameter of the mandrel, pouring liquid bonding means into the space defined by the adjacent catcher tubes, to completely capsulate the winding turns, and curing the bonding means to form a voidless, cast solid structure which securely anchors the conductor turns. If the catcher tubes are formed of an electrical insulating material having predetermined wall thicknesses, the winding is substantially completed, as the liquid bonding means will penetrate the insulating material, forming one coherent winding assembly, including the catcher tubes, which then form the major solid insulation to ground for the winding assembly. If the catcher tubes are not designed to provide winding insulation, the next step in the process is the removal of the cast winding structure from the catcher tubes.

Also disclosed, is a new and improved primary winding structure for potential transformers, which solves the expensive problem of providing preformed bobbins, and the problem of insulating adjacent layers of winding turns when the windings are layer wound. Instead of layer winding the turns across the length of the winding, which builds up the winding radially with the attendant problem of high potential differences between the end turns of adjacent layers, the winding is formed of turns all having the same diameter, which are randomly distributed across the radial width of the winding. The winding thus builds up axially along the length of the winding instead of radially. This construction may be formed by merely utilizing concentrically disposed catcher tubes, eliminating the need for any specially preformed supporting parts. Further, this construction of the winding, wherein the turns are firmly anchored in and completely surrounded by a solid, cast, void-free bonding means, and the fact that the winding builds up axially from one end of the winding to the other, provides excellent ability to withstand impulse and surge voltages. The embodiment of the invention which discloses the bonding of the inner and outer tubular members to the case bonding means also increases the dielectric strength of the winding assembly, as the bonding means penetrates the outer surface of the insulating tubular members, increasing the resistance of the major solid insulation to failure, in both puncture and creep.

Since numerous changes may be made in the above described apparatus and different embodiments of the invention may be made without departing from the spirit and scope thereof, it is intended that all matter contained in the foregoing description or shown in the accompanying drawings shall be interpreted as illustrative, and not in a limiting sense.

We claim as our invention:

1. The method of constructing a winding for electrical inductive apparatus, comprising the steps of:
    forming an electrical conductor into a plurality of conductor turns each having a predetermined diameter;
    dropping the conductor turns into a space defined by holding means until a predetermined height has been attained;
    pouring bonding means into the holding means; and
    curing the bonding means to form a cast solid winding assembly.

2. The method of claim 1 wherein each of said plurality of conductor turns have substantially the same predetermined diameter.

3. The method of claim 1 including the step of removing said cast solid winding assembly from the holding means.

4. The method of claim 1 wherein the holding means is formed of an electrical insulating material, and the bonding means adheres to the holding means.

5. The method of claim 1 wherein the holding means defines a substantially tubular space which is randomly filled with the plurality of conductor turns, starting at one end of the tubular space and progressing to the opposite end.

6. The method of constructing a winding assembly for electrical inductive apparatus, comprising the steps of:
    continuously forming an electrical conductor into a plurality of conductor turns against first means having a predetermined diameter;
    securing at least one of the conductor turns against the first means;
    releasing said at least one secured conductor turn as a predetermined subsequent conductor turn is formed;
    dropping said released conductor turns into a space defined by second means until a predetermined volume has been attained;
    pouring bonding means into the space defined by the second means; and
    curing the bonding means to form a solid cast winding assembly.

7. The method of claim 6 wherein the space provided by the second means is substantially tubular, having a mean diameter substantially equal to the diameter of the first means.

8. The method of claim 6 including the step of directing the released conductor turns along the first means prior to dropping the released conductor turns into the space defined by the second means.

9. The method of claim 8 wherein conductor turns are continuously being released, directed, and dropped, as subsequent conductor turns are being continuously formed and secured.

10. The method of claim 6 including the step of removing the cast solid winding assembly from the second means.

References Cited

UNITED STATES PATENTS

| | | | |
|---|---|---|---|
| 2,177,260 | 10/1939 | Laube | 29—605 |
| 2,392,790 | 1/1946 | Webb | 336—205 |
| 2,552,999 | 5/1951 | Pannel et al. | |
| 3,065,772 | 10/1962 | Amey | 29—605 |

CHARLIE T. MOON, *Primary Examiner.*

PAUL M. COHEN, *Assistant Examiner.*

U.S. Cl. X.R.
29—527; 72—135; 140—2